US011500922B2

(12) United States Patent
Fox et al.

(10) Patent No.: US 11,500,922 B2
(45) Date of Patent: Nov. 15, 2022

(54) METHOD FOR SENSORY ORCHESTRATION

(71) Applicant: International Business Machines Corporation, Armonk, NY (US)

(72) Inventors: Jeremy R. Fox, Georgetown, TX (US); John C. Rice, West Pennant Hills (AU); Liam S. Harpur, Dublin (IE); Christian B. Kau, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 16/136,048

(22) Filed: Sep. 19, 2018

(65) Prior Publication Data

US 2020/0089807 A1 Mar. 19, 2020

(51) Int. Cl.
*G06F 16/635* (2019.01)
*H04L 67/306* (2022.01)
(Continued)

(52) U.S. Cl.
CPC ........... *G06F 16/637* (2019.01); *G06F 17/18* (2013.01); *H04L 67/306* (2013.01); *H04L 67/535* (2022.05)

(58) Field of Classification Search
CPC ........ G06F 16/637; G06F 17/18; G06F 40/14; G06F 9/451; G06F 16/639; G06F 16/683; G06F 16/636; H04L 67/306; H04L 67/22; H04L 67/32; H04L 67/20; H04L 67/10; H04L 67/30; H04L 67/12; H04R 1/1083; H04R 1/403; H04R 1/406; H04R 2410/05; H04R 2460/01; H04R 2460/13; H04R 27/00; H04R 29/00; H04R 29/002; A61M 21/02; A61M 2021/0027; A61M 2230/06; A61M 2230/30; A61M 2230/50; A61M 2230/005; A61M 2021/0022; A61M 2021/0044; A61M 2205/3375;
(Continued)

(56) References Cited

U.S. PATENT DOCUMENTS 9,959,296 B1\* 5/2018 Gubin ................. G06F 16/2465
10,276,143 B2\* 4/2019 Prasad ................. H04R 29/002
(Continued)

FOREIGN PATENT DOCUMENTS

WO 2012064999 A1 5/2012

OTHER PUBLICATIONS

Mewcastle University, "Wired for sound: Enraging noises caused by brain connection overdrive," ScienceDaily, Feb. 3, 2017, 3 pages, retrieved from https://www.sciencedaily.com/releases/2017/02/170203085144.htm.

(Continued)

*Primary Examiner* — Yoshihisa Ishizuka
*Assistant Examiner* — Carter W Ferrell
(74) *Attorney, Agent, or Firm* — Zilka-Kotab, P.C.

(57) ABSTRACT

According to one embodiment, a computer-implemented method includes obtaining a sensory profile, identifying an occurrence of a sensory aspect event affecting a user, comparing the sensory aspect event to the sensory profile, determining from comparing the sensory profile, whether the sensory aspect event is a positive sensory aspect, and countering and/or adjusting the sensory aspect event in response to determining the sensory aspect event is not a positive sensory aspect.

20 Claims, 7 Drawing Sheets

(51) Int. Cl.
*G06F 17/18* (2006.01)
*H04L 67/50* (2022.01)

(58) Field of Classification Search
CPC .......... A61M 2205/3368; G06N 20/00; G06N 5/046; A61B 5/165; A61B 5/01; A61B 5/021; A61B 5/024; G09B 19/00; G16H 15/00; G16H 20/70; G16H 40/63
See application file for complete search history.

(56) References Cited

U.S. PATENT DOCUMENTS

| | | | | |
|---|---|---|---|---|
| 10,754,611 | B2* | 8/2020 | Agrawal | G06F 3/165 |
| 2010/0023094 | A1 | 1/2010 | Smith et al. | |
| 2013/0216985 | A1 | 8/2013 | de Villers-Sidani et al. | |
| 2013/0297599 | A1* | 11/2013 | Henshall | G06F 16/683 |
| | | | | 707/736 |
| 2015/0052089 | A1* | 2/2015 | Kozloski | G06N 20/00 |
| | | | | 706/12 |
| 2015/0221321 | A1* | 8/2015 | Christian | G10L 25/27 |
| | | | | 700/94 |
| 2015/0222989 | A1 | 8/2015 | Labrosse et al. | |
| 2016/0019813 | A1* | 1/2016 | Mullen | G16H 20/70 |
| | | | | 434/236 |
| 2019/0005937 | A1* | 1/2019 | Bostick | G06F 3/165 |
| 2019/0244427 | A1* | 8/2019 | Sun | G06T 19/006 |
| 2020/0060603 | A1* | 2/2020 | Bower | G16H 20/70 |

OTHER PUBLICATIONS

Rugg et al., "How does background noise affect our concentration?" Scientific American, Jan. 1, 2010, 8 pages, retrieved from https://www.scientificamerican.com/article/ask-the-brains-background-noise/.

Shih et al., "Correlation between work concentration level and background music: A pilot study," IOS Press, Work 33, 2009, pp. 329-333.

Soderlund et al., "The effects of background white noise on memory performance in inattentive school children," Behavioral and Brain Functions, 2010, pp. 1-10, retrieved from https://behavioralandbrainfunctions.biomedcentral.com/track/pdf/10.1186/1744-9081-6-55.

Noisli Ltd., "Improve focus and boost your productivity. Mix different sounds and create your perfect environment" Noisli, 2014, retrieved from https://www.noisli.com/.

* cited by examiner

METHOD FOR SENSORY ORCHESTRATION

BACKGROUND

The present invention relates to managing sensory perceptions to enhance performance of a task by a user, and more specifically, this invention relates to countering and/or adjusting a sensory aspect event based on a profile for promoting efficient task performance by a user.

In current work-place environments, people have difficulties in maintaining focus due to busy offices, social, collaborative, and internet distractions. There is no place to hide from these distractions and there are always distractions coming through tablets, phones, laptops, televisions, colleagues, etc. When concentrating at a high level on a specific task, a user may lose the ability to focus and concentrate during interference of external visuals and sounds. Distracting visuals and sounds may inevitably diminish performance. In contrast, certain ambient sounds may aid in relaxation and focus, and may, consequently, enhance performance. However, in other instances, ambient sounds may have a negative effect on focus of the individual and diminish performance.

A user and/or group may struggle to manage an overload or a sub-optimal mix of sensory information thereby resulting in an information overload. Too much information may cause the user and/or group to become less effective, and may induce stress, anxiety, and possibly cause a meltdown/breakdown of the user and/or group.

It would be desirable to manage the onslaught of sensory perceptions to an individual to encourage efficient performance of the individual performing a task.

SUMMARY

According to one embodiment, a computer-implemented method includes obtaining a sensory profile, identifying an occurrence of a sensory aspect event affecting a user, comparing the sensory aspect event to the sensory profile, determining from comparing the sensory profile, whether the sensory aspect event is a positive sensory aspect, and countering and/or adjusting the sensory aspect event in response to determining the sensory aspect event is not a positive sensory aspect.

According to another embodiment, a computer program product for managing sound events utilizing a user sound profile includes a computer readable storage medium having program instructions embodied therewith, where the computer readable storage medium is not a transitory signal per se. The program instructions executable by a computer to cause the computer to perform a method includes obtaining a sound profile, identifying an occurrence of a sound event affecting a user, comparing the sound event to the sound profile, determining from comparing the sound profile whether the sound event is a positive sound event, and countering and/or adjusting the sound event in response to determining the sound event is not a positive sound event.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments for creating a user profile usable to manage sensory aspects during a task, and methods for using said profile.

In one general embodiment, a computer-implemented method includes obtaining, by a computer, a sensory profile, identifying, by the computer, an occurrence of a sensory aspect event affecting a user, comparing, by the computer, the sensory aspect event to the sensory profile, determining, by the computer, from comparing the sensory profile, whether the sensory aspect event is a positive sensory aspect, and countering and/or adjusting, by the computer, the sensory aspect event in response to determining the sensory aspect event is not a positive sensory aspect.

In another general embodiment, a computer program product for managing sound events utilizing a user sound profile includes a computer readable storage medium having program instructions embodied therewith, where the computer readable storage medium is not a transitory signal per se. The program instructions executable by a computer to cause the computer to perform a method includes obtaining, by the computer, a sound profile, identifying, by the computer, an occurrence of a sound event affecting a user, comparing, by the computer, the sound event to the sound profile, determining, by the computer, from comparing the sound profile whether the sound event is a positive sound event, and countering and/or adjusting, by the computer, the sound event in response to determining the sound event is not a positive sound event.

Figure 1:
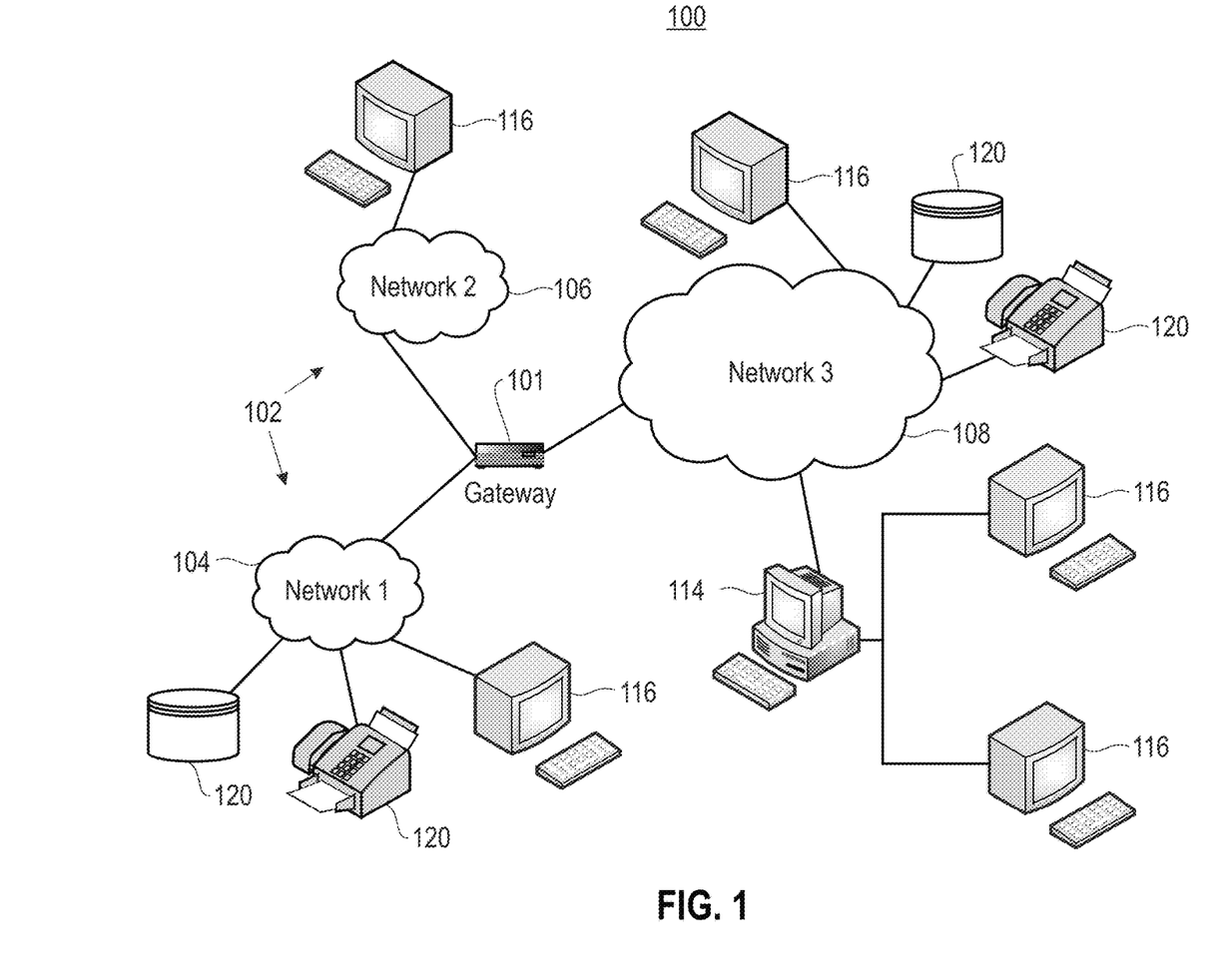
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
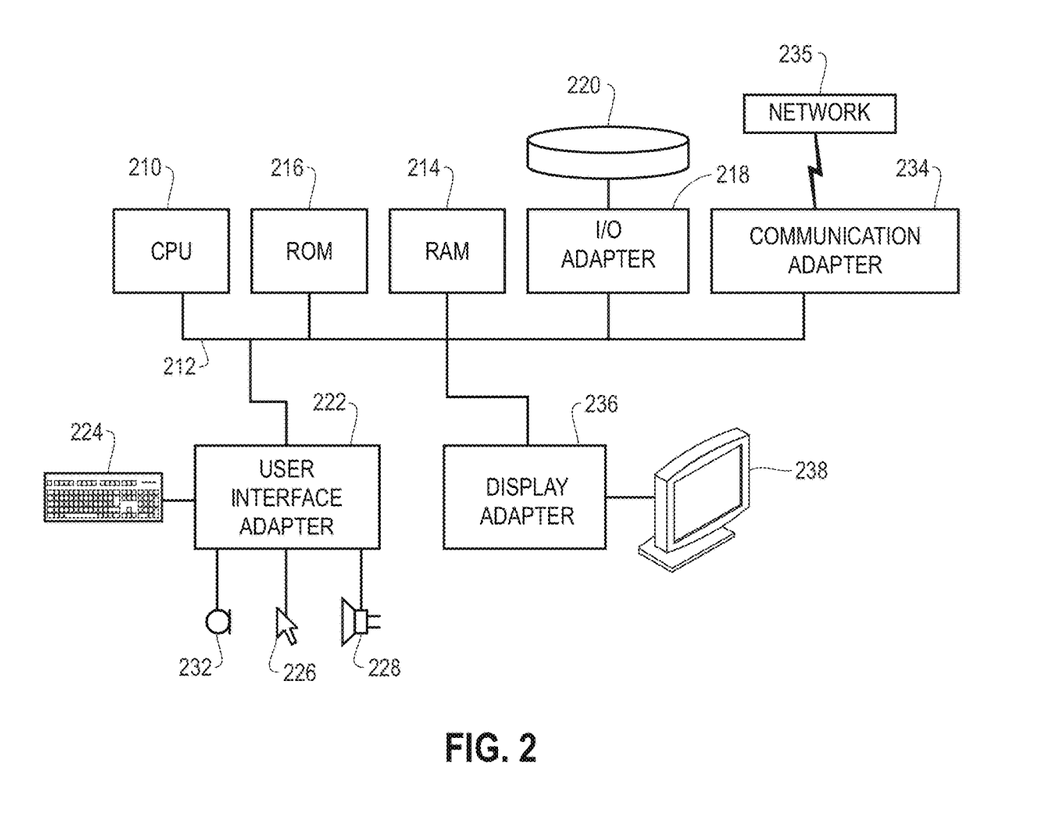
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

According to various embodiments described herein, methods are disclosed for managing sensory perceptions to enhance performance of a task by a user/group. The methods may relate a sensory input to different actions on a studied task, where the actions may demonstrate increased efficiency or decreased efficiency, i.e. inefficiencies, on a studied task. Using a sensory profile specific to a user, a system may manage sensory input to the user to enhance performance (e.g. output). In various embodiments, sensory input may include but not limited to: physical proximity, sound (e.g. foreground and/or background), on-screen and off-screen visuals, texture and/or touch, olfactory, etc.

Figure 3:
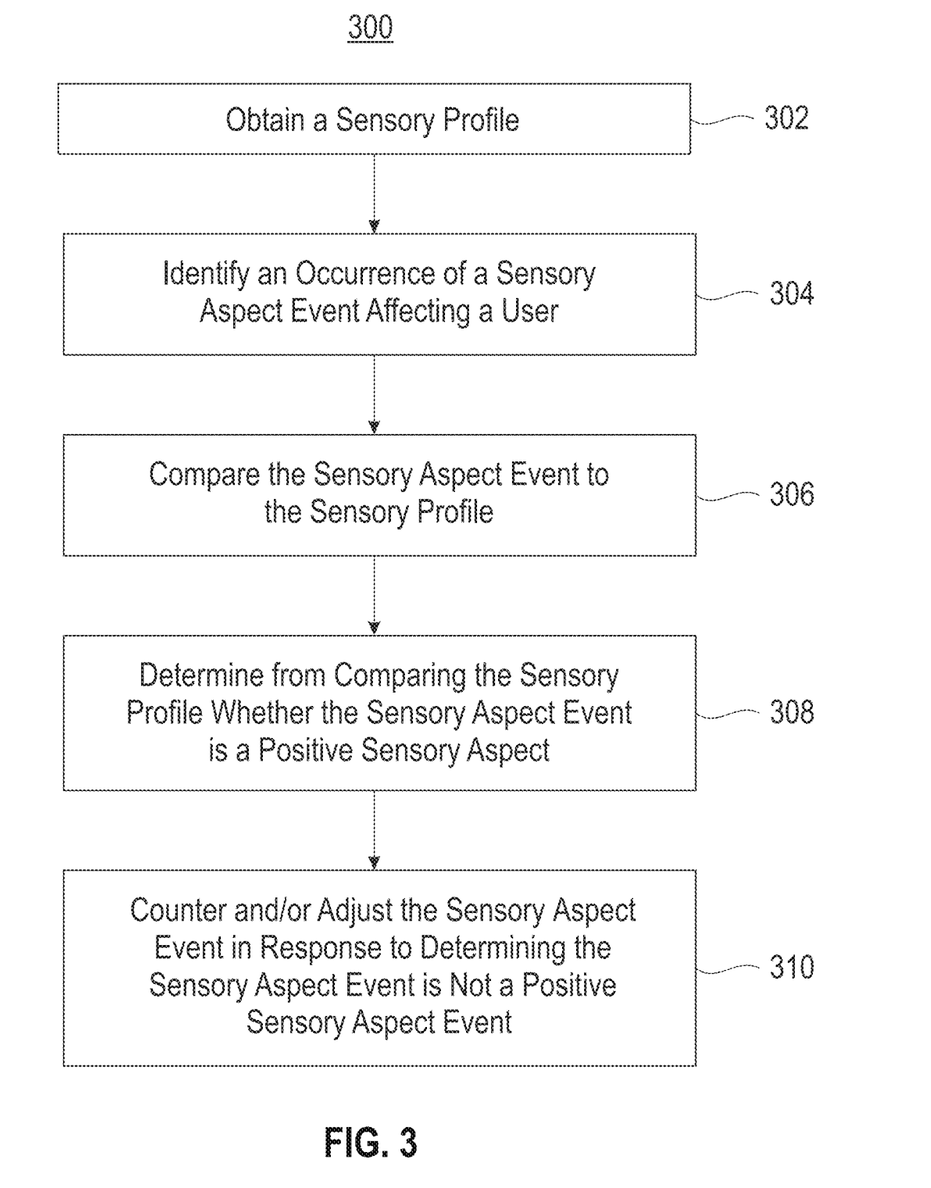
FIG. 3 is a flowchart of a method, in accordance with one embodiment.

Now referring to FIG. 3, a flowchart of a method 300 is shown according to one embodiment. The method 300 may be performed in accordance with the present invention in any of the environments depicted in FIGS. 1-5, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

In other embodiments, the method 300 may be performed remotely on a cloud, external server, etc. having processors associated therein. Moreover, in some embodiments, the method 300 may be performed with respect to specifications for a single user. In other embodiments, the method 300 may be performed with respect to specifications for a group of users.

As shown in FIG. 3, method 300 begins with operation 302 that includes obtaining, by a computer, a sensory profile. In some approaches, the sensory profile may be configured from the computer. In other approaches, the sensory profile may be obtained from a third party (e.g. a crowd-sourced file). In yet other approaches, the sensory profile may be obtained from a combination of a sensory profile configured from the computer and a sensory profile obtained from a third party.

In some approaches, the sensory profile may be a template sensory profile. In other approaches, the sensory profile may be created from specifications of the user. In other approaches, the sensory profile may be created from specification from a group of users. In yet other approaches, the template sensory profile is created from a crowd-sourced program. In yet other approaches, the sensory profile is template sensory profile updated with specifications from the user. In some approaches, the sensory profile may be a template sensory profile updated with specification from a group of users. In yet further approaches, the sensory profile may be a template sensory profile updated with specifications from the user and updated with specifications from a crowd-sourced program.

In various approaches, specifications of the sensory profile from the user may be obtained by textural inputs by the user. In some approaches, specifications of the sensory profile may be obtained automatically by the computer while a user is operating a task. In some approaches, specifications of the sensory profile may be obtained from a third party source (e.g. a crowd-sourced program).

The sensory profile includes one or more sensory aspects in a range from positive sensory aspects to negative sensory aspects. The plurality of positive sensory aspects may promote concentration of the user on a task. In some approaches, the range of sensory aspects may include sensory aspects that are designated as either positive sensory aspects or negative sensory aspects. In some approaches, the sensory aspects may have a score associated with the sensory aspect that indicates the level of positive effect or negative effect on the user. In some approaches, the sensory profile includes one or more default sensory aspects created by a system based on information not from the user. In some approaches, the sensory profile includes one or more custom sensory aspects created based on input from the user.

In some approaches, the sensory profile may have a pre-defined mean value, where the mean value represents a threshold of positive sensory effect on the user. For example, and not meant to be limiting, sensory aspects with score below the threshold (e.g. below the pre-defined mean value) may be labeled as negative sensory aspects and sensory aspects with a score above the threshold may be labeled as a positive sensory aspect. In some approaches, the sensory aspect receives a score from the computer. In other approaches, the sensory aspect receives a score from the user. In yet other approaches, the sensory aspect receives a score from a third party (e.g. a crowd-sourced program).

In some approaches, creating the user sensory profile may include building a corpus of sensory input specific to an individual user. For example, the user sensory profile may include sensory input of concentrating events that promote relaxation, concentration, focus, etc. as well as sensory input of distracting events that distract from specific tasks and cause a decrease in performance of a task. In some approaches, textual input may be derived from a questionnaire, survey, etc. completed by the user.

Method 300 includes operation 304 of identifying, by the computer, an occurrence of a sensory aspect event affecting a user. In some approaches, the occurrence of a sensory aspect may be received through the computer. For example, for a sound event, the occurrence may be received through the microphone of the computer, where the sound event is from the environment surrounding the user. In some approaches, the occurrence could be from a program run by the computer. For example, a sound aspect or event may be received from a speaker of the computer that is outputting a music program playing music or ambient sounds chosen by the user. For example, a visual aspect may be received from the screen of the device, where the visual aspect is the space surrounding the page of the current task performed by the user. These examples are merely illustrative examples and are not meant to be limiting in any way.

In some approaches, the sensory aspect may be identified by a sensory aspect analyzing program. For example, a sound event may be identified by a Sound Analyzer. In some approaches, the Sound Analyzer may be a program run by the computer. In other approaches, the Sound Analyzer may be a remote program in a cloud or network that may be accessed by the computer.

Operation 306 includes comparing, by the computer, the sensory aspect event to the sensory profile. In some approaches, comparing the sensory aspect event may include receiving data corresponding to user performance of a task on a device during the occurrence of the sensory aspect event, correlating the sensory aspect event to the data corresponding to user performance of the task, and updating the sensory profile based on the correlation of the sensory aspect event to the user performance of the task.

In some embodiments, the effects of sensory input may be monitored over a period of time by a single or group of users and collected as sensory input data. In some approaches, the program may correlate the sensory input data in terms of optimizing sensory data or negative sensory input that affect performance of the user performing a task.

In some approaches, correlating the sensory aspect event to the data corresponding to the user performance of a task includes analyzing the data corresponding to user performance of the task during the occurrence of the sensory aspect event. The data may include a plurality of quantitative measurements during the occurrence of the sensory aspect event. In further approaches, the method 300 may include assigning a correlation of the sensory aspect event to the data corresponding to user performance of the task indicating a level of correspondence between the sensory aspect event and the data corresponding to user performance of the task.

Following comparing the sensory aspect event to the sensory profile, operation 308 of method 300 includes determining whether the sensory aspect event is a positive sensory aspect. If the method determines that the sensory aspect event is a positive sensory aspect, then the sensory aspect may not be adjusted and the user continues to receive the sensory aspect event. In some approaches, the positive sensory aspect event may be designated as concentrating, promoting concentration, positive, etc. in the sensory profile specific to the user.

In response to determining the sensory aspect event is not a positive sensory aspect, operation 310 includes countering and/or adjusting the sensory aspect event. In some approaches, the method may use the correlated sensory input data to input a positive sensory aspect (e.g. positive sounds, visuals, etc.). In some approaches, countering the sensory aspect event includes canceling, removing, preventing, etc. negative sensory input (e.g. positive sounds, visuals, etc.) during a task thereby leading to enhanced performance of a task by an individual or by a group. In some approaches, countering and/or adjusting the sensory input includes minimizing the sensory aspect event. In various approaches, countering and/or adjusting the sensory aspect event includes a combination of approaches as described above, (e.g. canceling the negative sensory aspect and then inputting a positive sensory aspect to the user).

In various approaches, the method may minimize distractions by blocking distracting sensory input (sounds, visuals, etc.) and inject optimizing sensory input (sounds, visuals, etc.) that lead to increased productivity. In some approaches, such as the case of optimizing sound input to the user, the optimal sounds may be crowd sourced and specific to an individual or specific to a latent class.

In some embodiments, the method may be enabled on a social server or a content server that uses authentication methods to log users and their behaviors. Over time, the method may monitor the user's performance while taking input from the surrounding sensory environment (e.g. from the external microphone of the computer). The method may model the sound input to efficiencies of the user performance of a specific task. In some approaches, the method is a learning system that continuously and automatically adapts to the user.

In various embodiments, by gauging the sensory input during performance of a task, the method may recognize the onset of overload when the sensory input reaches above a certain level (e.g. predefined threshold). The sensory input overload may manifest in the user as behavior outside a statistical threshold. For example, behavior that represents sensory input over a certain statistical threshold may include a panic attack, "hyper" activity, shutting down, psychological meltdown, etc.

In one embodiment of the method, the sensory aspect event is a sound event heard by the user while performing a task. The sensory profile for the user is a sound profile. The user sound profile may include at least one of one or more sensory aspects that include a sound event. In some approaches, a sound profile includes a range from positive (e.g. concentrating) sound aspects to negative (e.g. distracting) sound aspects. The user sound profile may include one or more default sound inputs created automatically by a program and one or more custom sound inputs created in response to textual input by the user.

Figure 4:
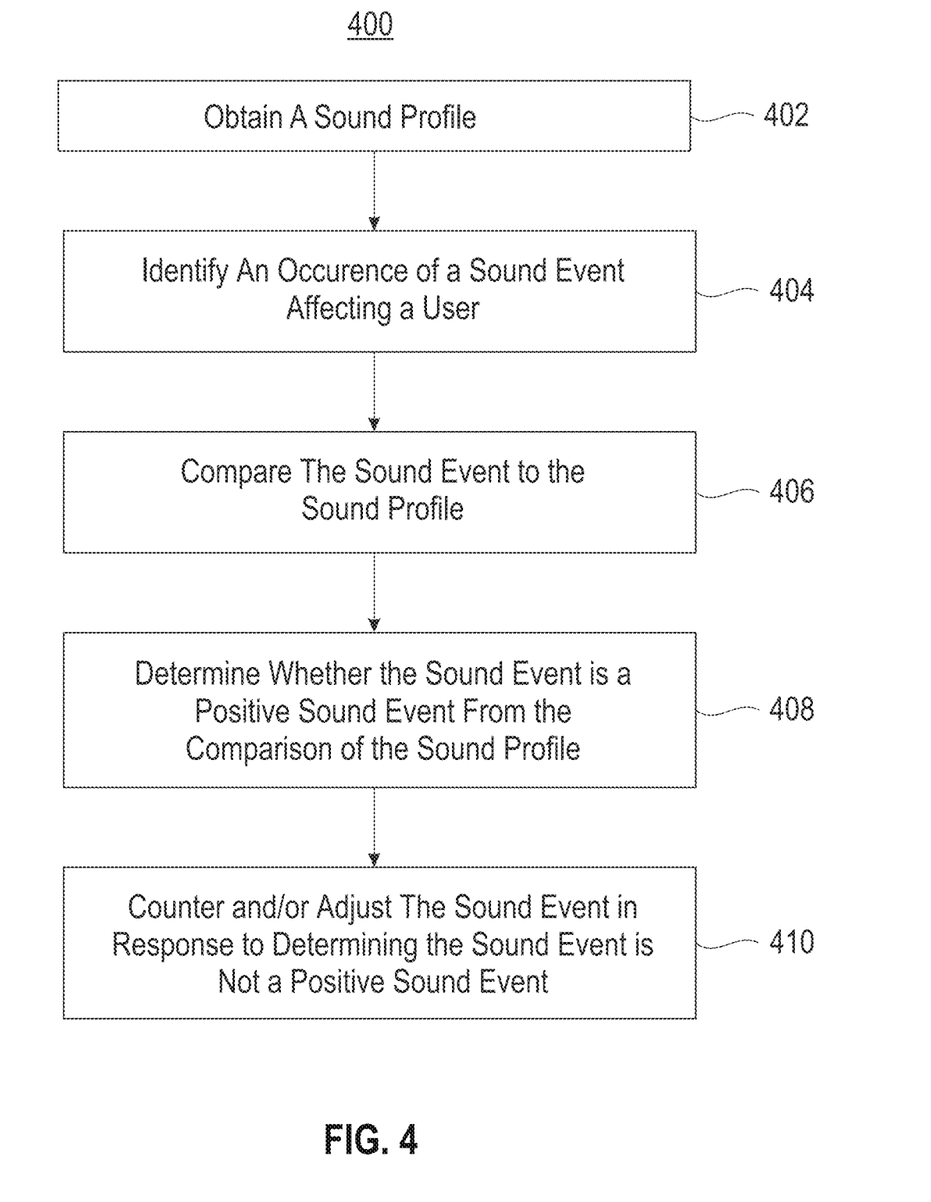
FIG. 4 is a flowchart of a method, in accordance with one embodiment.

Now referring to FIG. 4, a flowchart of a method 400 for managing sound events utilizing a user sound profile is shown according to one embodiment. The method 400 may be performed in accordance with the present invention in any of the environments depicted in FIGS. 1-5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a sound profile is obtained by the program. In some approaches, the sound profile includes one or more sound events in a range from positive sound event to negative sound event, where a plurality of positive sound effects promote concentration of the user on a task.

Operation 404 of method 400 is where an occurrence of a sound event affecting a user is identified by the computer. In some approaches, the sound event is identified using a sound analyzer. In some approaches, the sound analyzer is a program on the computer. In other approaches, the sound analyzer is a program on a cloud-based system or network that is contacted by the computer remotely, and the computer instructs, remotely, the sound analyzer to identify the sound event.

Operation 406 of method 400 is where the sound event is compared to the sound profile.

Following comparing the sound event to the sound profile, operation 408 is a determination of whether the sound event is a positive sound event.

Operation 410 is where the sound event is countered and/or adjusted by the computer in response to determining the sound event is not a positive sound event.

Figure 5:
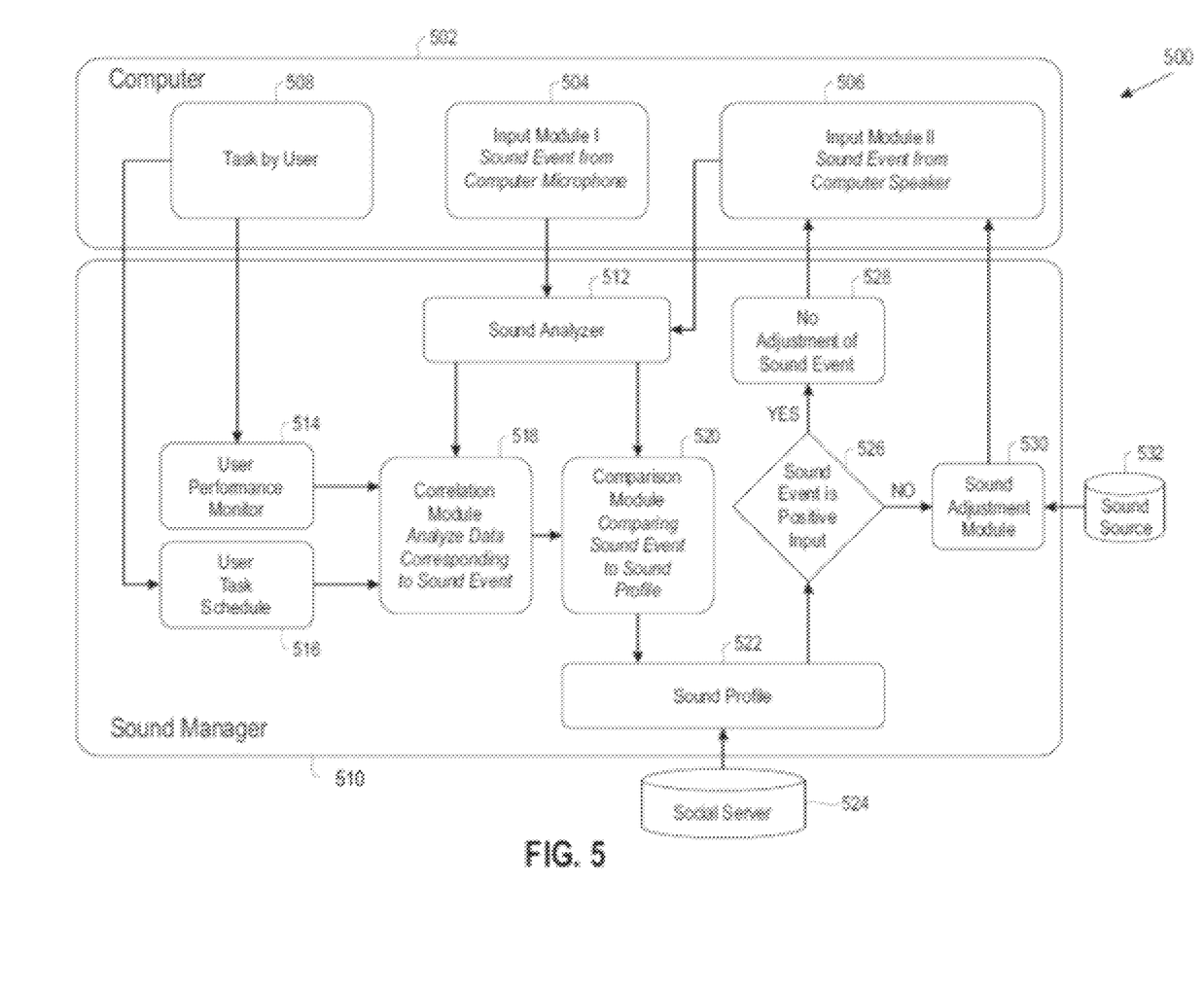
FIG. 5 is a schematic diagram of a method, in accordance with one embodiment.

Now referring to FIG. 5, a schematic diagram of a flowchart of a method 500 for managing sound events utilizing a user sound profile is shown according to one embodiment. The method 500 may be performed in accordance with the present invention in any of the environments depicted in FIGS. 1-5, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

FIG. 5 is a schematic diagram of the operations included in method 500. Similar to method 400 of FIG. 4, method 500 includes a Sound Manager 510 obtaining a sound profile 522. In some approaches, the Sound Manager 510 may be a system run on a computer 502. In other approaches, the Sound Manager 510 is located remotely from the computer and manages the sound according to method 500 through remote access to the computer 502 being used by the user.

In some approaches, the sound profile 522 may be a template sound profile. In other approaches, a sound profile 522 may be created from specifications of the user thereby being a user specific sound profile. In yet other approaches, the sound profile 522 may be a template sound profile created from a crowd-sourced program. For example, the sound profile 522 may be a sound profile created from a social server 524. In various approaches, the sound profile may be a combination of the approaches described herein, e.g. a template sound profile updated with specifications from the user and updated with sound profiles from a crowd sourced program.

In various approaches, the sound profile 522 may include one or more sound events in a range from positive sound event to negative sound event. A plurality of positive sound events may promote concentration of the user on a task whereas a plurality of negative sound events may promote distraction of the user on a task.

In some approaches, the sound profile 522 may include one or more default sound events created by a program based on information not from the user, where the sound profile includes one or more custom sound events created based on input from the user. In some approaches, one or more default sound events of the sound profile 522 may be received remotely from a social server 524.

Looking back to operation 404 of method 400 (see FIG. 4), method 500 as graphically displayed in FIG. 5 includes identifying an occurrence of a sound event affecting a user. The occurrence of a sound event may be received by an Input Module I 504. In some approaches, an Input Module I 504 may be a computer microphone that receives sound surrounding the computer. In some approaches, the Input Module I 504 may be a microphone as part of the computer hardware. In some approaches Input Module I 504 may be a computer microphone that is externally connected to the computer (e.g. a USB connection, a firewire connection, microphone port connection, etc.). In some approaches, of method 500 a sound event may be received via more than one Input Module I 504 associated with the computer 502.

Sound events received by the Input Module I 504 may be sound events from the environment around the user. For example, sound events received by the Input Module I 504 may be a child screaming, a siren, a dishwasher running, etc. In some approaches, the Sound Manager 510 may determine whether the sound event received from the Input Module I 504 is distracting to the user, concentrating to the user or neutral (has not effect) to the user, and manages the sound event from the resulting determination.

The occurrence of a sound event affecting the user may also be received by a second input module, Input Module II 506 that receives sound events generated from a program on the computer 502, for example from the speaker(s) of the computer. In some approaches, sound events from the Input Module II 506 may be user selected sounds, e.g. music selected by the user from a music program on the computer, sound events generated from the program being used to perform associated with the Task Module 508, etc.

As shown in the schematic diagram of method 500, the occurrence of a sound event received by the Input Module I 504 and/or Input Module II 506 is received by the Sound Analyzer 512. In some approaches, the Sound Analyzer 512 may be integrated in the Sound Manager 510. In other approaches, the Sound Analyzer may be located remotely from the Sound Manager 510 such that the Sound Manager 510 may utilize a Sound Analyzer remotely to identify a sound event.

As shown in the embodiment of method 500, the performance of a task by a user may be monitored during the occurrence of a sound event. A computer 502 may include a task module 508 that represents a task being performed by a user. The task module 508 may be a program being run on the computer, for example, a word processing program, a graphics program, a game, etc. In some approaches, the task module 508 may be remotely connected to the computer 502. For example, the user is working on a program at a remote location (e.g. cloud, network, etc.) and using the computer to access the program at the remote location.

In some approaches, the Sound Manager 510 manages the sound event relative to the performance of a task by a user who is affected by the sound event. The Sound Manager 510 may receive data corresponding to user performance of a task on a device during the occurrence of the sound event. In some approaches, the Sound Manager utilizes a User Performance Monitor 514 to receive data corresponding to user performance of a task generated from the Task Module 508. In various approaches, the at least one quantitative measurement includes at least one quantitative measurement of task efficiency by the user during occurrence of the sound event. For example, but not limited to, in a word processing program, the quantitative measurement may include word count/minute, deletions/minute, backstroke/minute, etc. In some approaches, the data may be received continuously at predefined intervals (time intervals, content intervals, etc.). In other approaches, the User Performance Monitor 514 may be triggered to receive data if the Input Module I 504 and/or Input Module II 506 receive a sound event.

In various approaches, the Sound Manager may correlate the sound event to the data corresponding to the user performance of the task. As shown in the schematic diagram of method 500, the Sound Manager 510 may utilize a Correlation Module 518 to analyze the data corresponding to the user performance of a task during an occurrence of a sound event.

In some approaches, the data corresponding to the user performance of a task may include a time schedule of a task(s) performed by the user. In some approaches, the Sound Manager 510 may receive a schedule of the tasks performed by the user via the User Task Schedule Module 516. In some approaches, the Sound Manager 510 uses the schedule from the User Task Schedule Module 516 to correlate the sound event to the task being performed by the user concurrently with receiving the data of user performance of the task from the User Performance Monitor 514.

In some approaches, the Sound Manager may access a Schedule Module that is remotely located from the Sound Manager. For example, a remote Schedule Module may be a timetable loaded on a social server, university server, transportation server, etc. The Sound Manager may access the remote Schedule Module for temporal schedules of the sound events input to the user.

In some approaches, the Sound Manager correlates the user task performance to the sound event by analyzing the data corresponding to user performance of the task during the occurrence of the sound event. The data may include at least one quantitative measurement during the occurrence of the sound event. In some approaches, analysis of the data of the sound event includes using at least one computer-implemented analysis program. For example, but not limited to, computer-implemented analysis programs may include Latent Class Model, Principle Component Analysis, etc.

In some embodiments, as well as modeling individual users, the program may model groups of users. The program may use data analysis programs (e.g. Latent Class Analysis) to better understand a broader array of users. In some approaches, modeling according to a group provides the advantage that sound input of the surroundings of an individual may be similar to sound input of the surroundings of the individual's social peers from different locations. The program may use analytics derived from data analysis programs to learn to differentiate users by specific user characteristics and thereby deliver a unique experience to each individual. Clustering analysis may help in clustering the users to quickly provide new users an optimized output for each of the user's scheduled tasks.

Following the analysis of the data corresponding to user performance of the task during the occurrence of a sound event, the Sound Manager may assign a correlation of the sound event to the data corresponding to user performance of the task indicating a level of correspondence between the sound event and the data corresponding to user performance of the task. In some approaches, the Sound Manager may assign an efficiency score (e.g. concentrating or distracting)

to the sound event that correlates to the analysis of the user performance of the task during the occurrence of the sound event.

As shown for method 500, the Sound Manager may compare the sound event to the sound profile, as similarly described in operation 406 of method 400 (see FIG. 4 for reference). The Sound Manager 510 may utilize a Comparison Module 520 to compare the sound event to the sound profile 522. In some approaches, the Sound Manager 510 may compare the sound event to the Sound Profile 522 after identifying the sound event via the Sound Analyzer 512. In other approaches, the Sound Manager 510 may compare the sound event after correlating the data corresponding to the user performance of a task during the occurrence of a sound event to the sound event (Correlation Module 518). In some approaches, the Sound Manager 510 may compare the sound event to the Sound Profile 522 both directly after identifying the sound event from the Sound Analyzer 512 and after analyzing the sound event via the Correlation Module 518.

In some approaches, the Sound Manager may update the sound profile based on the correlation of the sound event to the user performance of the task.

From the comparison of the sound event to the Sound Profile, the Sound Manager determines whether the sound event is a positive sound event (decision module 526). If the Sound Manager 510 determines that the sound event is a positive sound event, then the sound event may not be adjusted (module 528) and the user continues to receive the sound event. In some approaches, the positive sound event may be designated as concentrating, promoting concentration, positive, etc. in the Sound Profile 522 specific to the user.

If the Sound Manager 510 determines that the sound event is not a positive sound event, then the Sound Manager 510 may counter and/or adjust the sound event. In some approaches, the Sound Manager 510 may utilize a Sound Adjustment Module 530 to counter and/or adjust the sound event. In some approaches, the countering and/or adjusting the sound event includes at canceling the sound event. In some approaches, the countering and/or adjusting the sound event includes minimizing the sound event. In some approaches, the countering and/or adjusting the sound event includes inputting a second sound event. In various approaches, the countering and/or adjusting the sound event may include a combination of the approaches described herein.

In some approaches, the Sound Manager 510 may retrieve sounds to counter and/or adjust the sound event from a Sound Source 532. In some approaches, the Sound Source 532 may be located remotely from the Sound Manager 510 such that the Sound Manager 510 may access the Sound Source 532 via a cloud, a network, etc.

In various approaches, the Sound Manager 510 outputs the countering and/or adjusting of the sound event from the Sound Adjustment Module 530 to the Input Module II 506. In subsequent actions, the countered and/or adjusted sound event is managed by the Sound Manager 510 as received from the Input Module II 506. For example, in some approaches, the Sound Manager 510 may direct the Sound Adjustment Module 530 to create a noise cancelling wave that may be input into the user's Input Module II 506 to cancel negative sound events that may result in enhance productivity of the user. In other approaches, the Sound Manager 510 may direct the Sound Adjustment Module 530 to simply cancel the negative sound event. In some approaches, the Sound Manager 510 may direct the Sound Adjustment Module 530 to inject positive sounds to be amplified from the Input Module II 506, e.g. the computer speakers, for example, sounds of a beach, crashing waves, etc. to enhanced productivity, according to the user sound profile.

In various approaches, the program is a machine learning program where the Sound Manager may be continuously updating the sound profile as sound events are input and analyzed in correlation with the user performance of a task. In various approaches, the Sound Manager 510 may continuously adjust the received sound events corresponding to user performance as well as updating the sound profile according to user performance during occurrence of the sound event.

For example, a Sound Manager may determine that rock music is a positive sound corresponding to a positive efficiency score of word processing by a user for thirty minutes, so the rock music continues. However, the user's efficiency of word processing declines, so the Sound Manager then designates the rock music as distracting and updates the User Sound Profile to reflect the rock music as distracting and thus changes the rock music to music with a higher efficiency/positive sound score from the User Sound Profile.

Example A of positive sensory input. The Sound Manager may determine from the calendar and scheduling database that from 1:00 pm to 2:00 pm User A is working on an Essay and usually during this time User A listens to Ambient input (e.g. input from a website, radio, etc.). While User A is performing the task (e.g. working on an Essay), the computer keyboard and word processor may provide input for efficiency data modeling of the task performance of User A. Thus, while listening to Ambient sounds, User A may type a certain number (x) of words per minute or the word count may increase by (x) words every 10 seconds when birds are chirping, thereby indicating this sound of birds chirping has a positive impact on performance of the user during the task. In some approaches, a Sensory Manager may determine other sensory input indicators, for example, the user's mood, pupil dilation, etc. that may be affected by random environmental sounds.

Example B of ongoing modification of the program. Each day at 13:00 a cuckoo clock may start to cuckoo, or a church bell may start to ring. This environmental sound may halt, reduce, etc. the user's input. Thus, by monitoring the user's performance activity of the current task, the program may correlate the sound as a distraction that reduces performance. Over time, the method may model the input data (e.g. sounds, visuals, etc.) inefficiencies. The program may add the sound data to a user sound profile to manage sounds around the user (environmental, computer, etc.) by injecting positive sounds and/or canceling the negative sounds.

Example C. User A works according to a specific university timetable, and the university timetable is loaded on the social server, university server, etc. The sound

TABLE 1

UserA Schedule of Tasks
University Schedule

| Start | End | Task |
|---|---|---|
| 13:00 | 14:00 | Graphic Design |
| 14:00 | 15:00 | Essay Writing |
| 15:00 | 16:00 | Gaming | manager of the program may acknowledge the different types of tasks scheduled according to the university timetable (see Table 1). From 13:00 to 14:00, User A works on a graphic design software designing logos, so during this time, the sound manager may determine from the user sound input (e.g. internal music software, external microphone input, etc.) that User A has increased performance efficiency when User A sings or listens to Ambient music while working on a graphic design software. The sound manager may determine Ambient music to be more productive for User A and rock-and-roll music to be less productive for User A during the specific task of working on graphic design software.

From 14:00 to 15:00 User A works on a word processing program. During this time, User A may not input music, but prefers to work in a quiet environment. The sound manager may monitor performance of User A over time by monitoring User A characteristics of performance using the software, e.g. keyboard input, number of mistakes, paragraph deletions, etc. Thus, the program may model User A characteristics of performance to set an expectation of the level of performance during the designated time period. Thereafter, the sound manager monitors environmental sound input (e.g. car horn, drilling, etc.) via the external microphone and compares the sounds with the external sound input. In some approaches, the program may graph the effects of the environmental sounds to characteristics of User A performance (e.g. the car horn beeps for 5 minutes, a sound that corresponds with User A deleting a paragraph shortly thereafter). These efficiencies/inefficiencies may be modeled over time against the noises.

From 15:00 to 16:00, User A listens to hard rock-and-roll music very loud while User A is gaming. The sound manager may determine that noise does not affect User A's performance of the task (e.g. gaming), such that User A performs well with any noise at any volume.

Figure 6:
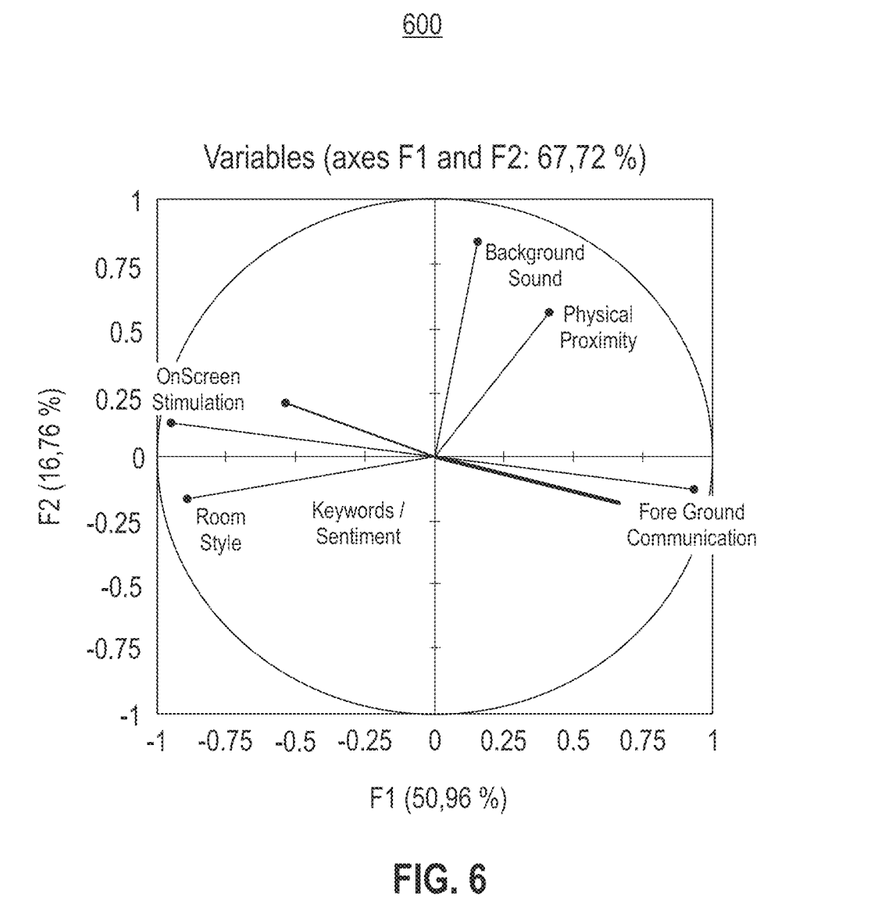
FIG. 6 is an example of a plot of a Principle Component Analysis, in accordance with one embodiment.

In some approaches, the program may use specific data analysis software to understand the variable impact of different sounds on user performance. For example, as shown in FIG. 6, a plot Principle Component Analysis 600 shows the impact of different sensory aspects on user performance.

In some approaches, clustering analysis across a group may be done to ascertain the best overall fit for the group and the task.

Figure 7:
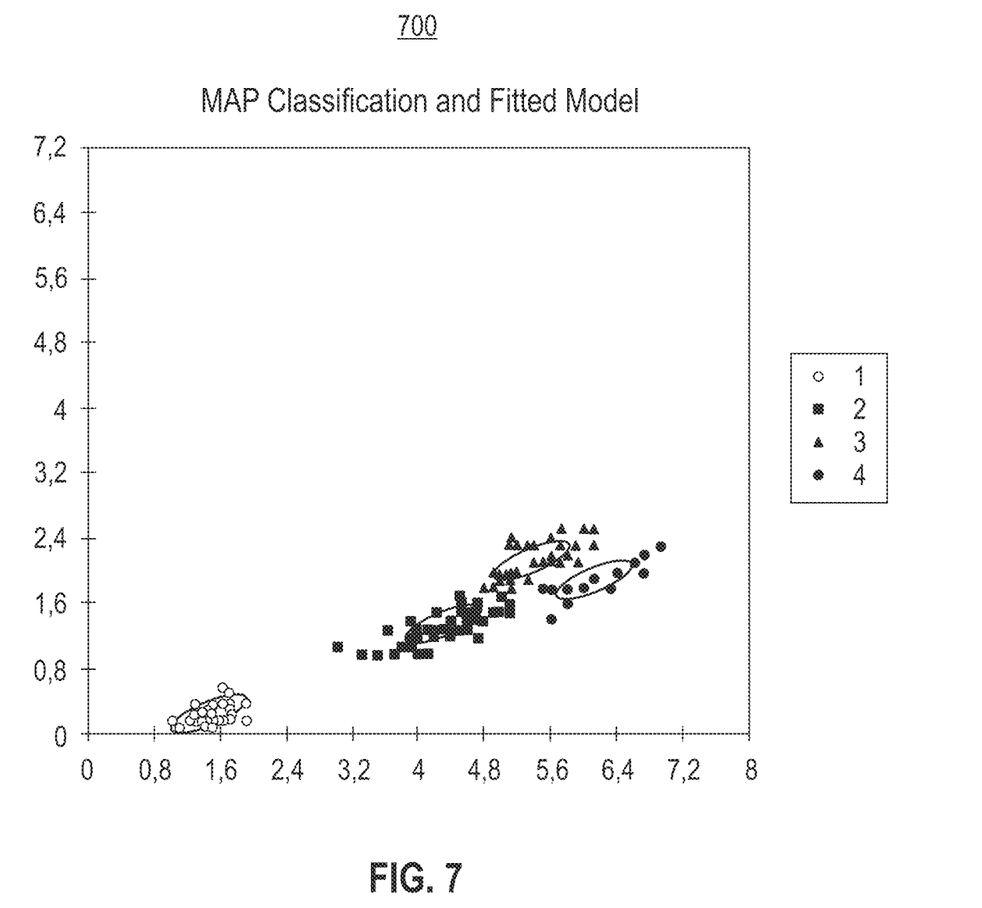
FIG. 7 is a plot of a clustering diagram of a Latent Class model, in accordance with one embodiment.

For example, as shown the clustering diagram 700 illustrated in FIG. 7, a task (4) monitoring throughput, that visual input should be below a certain threshold. For each "sub-cluster" (1, 2, 3, 4) there may be a separate latent Class model that gives a subsequent recommendation to the sound manager for output to the user.

Similarly, in approaches where the recommendation includes visuals and/or touch sensory manipulation, a Latent Class Model may be used to identify negative sensory aspects that decrease performance. The program may implement negative canceling sensory aspects or positive sensory aspects to enhance performance.

According to various embodiments described herein, a method manages sensory perceptions (e.g. environmental inputs from the area surrounding the user, user selected inputs, etc.) by monitoring task performance by a user during one or more sensory aspect events and comparing one or more sensory aspect events with sensory aspects in a sensory profile to enhance task performance, and thereby adjusting the sensory aspect event to improve user performance of a task.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
obtaining, by the computer, a sensory profile comprising a series of sensory aspects correlating to user performance of a user on a task, wherein the sensory aspects are in a range from positive sensory aspects to negative sensory aspects;
identifying, by the computer, an occurrence of a sensory aspect event affecting the user, wherein the sensory aspect event is identified by a sensory aspect analyzing program, wherein the sensory aspect event is selected from the group consisting of:
a sound event, a visual event, a touch sensory event, an olfactory event, and a combination thereof;
receiving, by the computer, data corresponding to the user performance of the task on a user device during the occurrence of the sensory aspect event, wherein the data is received from at least one user interface device of the user device;
determining, by the computer, whether the sensory aspect event is a negative sensory aspect event or a positive sensory aspect event, based on the sensory aspect event, the data corresponding the user performance of the task, and the sensory profile, wherein the sensory profile comprises a predefined mean value representing a threshold of positive sensory effect for the user;
wherein when the data corresponding to user performance of the task is below the predefined mean value, the sensory aspect event is the negative sensory aspect event;
wherein when the data corresponding to user performance of the task is above the predefined mean value, the sensory aspect event is the positive sensory aspect event;
updating, by the computer, the sensory profile based on the negative sensory aspect event or the positive sensory aspect event; and countering and/or adjusting, by the computer, the sensory aspect event in response to determining the sensory aspect event is the negative sensory aspect event, wherein the countering and/or adjusting the sensory aspect event results in a change in the user performance of the task on the user device, wherein the change is measured by the data received from the at least one user interface device.

2. The computer-implemented method as recited in claim 1, wherein the sensory profile includes one or more sensory aspects in a range from positive sensory aspects to negative sensory aspects, wherein a plurality of positive sensory aspects promote concentration of the user on a task.

3. The computer-implemented method as recited in claim 2, wherein the sensory profile is selected from the group consisting of: a template sensory profile, a sensory profile created from specifications of the user, a template sensory profile created from a crowd-sourced program, and a combination thereof.

4. The computer-implemented method as recited in claim 1, wherein the occurrence of the sensory aspect event is affecting the user performing a task on a user device.

5. The computer-implemented method as recited in claim 4, wherein the sensory profile includes one or more default sensory aspects created by a system based on information not from the user, wherein the sensory profile includes one or more custom sensory aspects created based on input from the user, wherein the at least one user interface device includes one or more user interface devices selected from the group consisting of: a keyboard, a mouse, a speaker, a microphone, a touch screen, and a digital camera.

6. The computer-implemented method as recited in claim 1, comprising:

after comparing the sensory aspect event to the sensory profile, updating, by the computer, the sensory profile based on the correlation of the sensory aspect event to the user performance of the task.

7. The computer-implemented method of claim 6, wherein correlating the sensory aspect event to the data comprises:

analyzing the data corresponding to user performance of the task during the occurrence of the sensory aspect event, wherein the data includes a plurality of quantitative measurements during the occurrence of the sensory aspect event; and assigning a correlation of the sensory aspect event to the data corresponding to user performance of the task indicating a level of correspondence between the sensory aspect event and the data corresponding to user performance of the task.

8. The computer-implemented method of claim 1, wherein countering and/or adjusting the sensory aspect event includes at least one action selected from the group consisting of: canceling the sensory aspect event, minimizing the sensory aspect event, and removing the sensory aspect event.

9. A computer program product for managing sound events utilizing a user sound profile, the computer program product comprising a computer readable storage medium having program instructions embodied therewith, the program instructions executable by a computer to cause the computer to perform a method comprising:

obtaining, by the computer, a sound profile comprising a series of sensory aspects correlating to user performance of a user on a task, wherein the sensory aspects are in a range from positive sensory aspects to negative sensory aspects;

identify, by the computer, an occurrence of a sound event affecting a user performing a task on a user device, wherein the sound event is identified by a sound event analyzing program;

receive, by the computer, data corresponding to user performance of the task on the user device during the occurrence of the sound event, wherein the data is received from at least one user interface device of the user device;

determine, by the computer, whether the sound event is a negative sound event or a positive sensory aspect event, based on the sound event, the data corresponding the user performance of the task, and the sound profile, wherein the sensory profile comprises a predefined mean value representing a threshold of positive sensory effect for the user;

wherein when the data corresponding to user performance of the task is below the predefined mean value, the sound event is the negative sound event;

wherein when the data corresponding to user performance of the task is above the predefined mean value, the sound event is the positive sound event; and counter and/or adjust, by the computer, the sound event in response to determining the sound event is the negative sound event.

10. The computer program product as recited in claim 9, wherein the sound profile includes one or more sound events in a range from positive sound event to negative sound event, wherein a plurality of positive sound effects promote concentration of the user on a task.

11. The computer program product as recited in claim 9, wherein the sound profile is at least one selected from the group consisting of: a template sound profile, a sound profile created from specifications of the user, a template sound profile created from a crowd-sourced program, and a combination thereof.

12. The computer program product as recited in claim 11, wherein the sound profile includes one or more default sound events created by a system based on information not from the user, wherein the sound profile includes one or more custom sound events created based on input from the user.

13. The computer program product of as recited in claim 12, wherein one or more default sound events of the sound profile are received remotely from a social server.

14. The computer program product as recited in claim 13, wherein the social server is a crowd-sourced data program.

15. The computer program product as recited in claim 9, comprising computer program instructions executable by the computer to cause the computer to:

receive data, by the computer, corresponding to user performance of a task on a device during the occurrence of the sound event;

correlate, by the computer, the sound event to the data corresponding to the user performance of the task; and after the correlating, update, by the computer, the sound profile based on the correlation of the sound event to the user performance of the task.

16. The computer program product as recited in claim 15, the correlation of the sound event to the data comprising:

analyzing, by the computer, the data corresponding to user performance of the task during the occurrence of the sound event, wherein the data includes at least one quantitative measurement during the occurrence of the sound event; and assigning, by the computer, a correlation of the sound event to the data corresponding to user performance of the task indicating a level of correspondence between the sound event and the data corresponding to user performance of the task.

17. The computer program product as recited in claim 16, wherein analysis of the data of the sound event includes using at least one computer-implemented analysis program.

18. The computer program product as recited in claim 16, wherein the at least one quantitative measurement includes at least one quantitative measurement of task efficiency by the user during the occurrence of the sound event.

19. The computer program product as recited in claim 16, wherein the data includes a time schedule of the task performed by the user.

20. The computer program product of claim 9, wherein counter and/or adjust the sound event includes at least one action selected from the group consisting of: cancel the sound event, minimize the sound event input a second sound event, and a combination thereof.

* * * * *